United States Patent Office 3,697,388
Patented Oct. 10, 1972

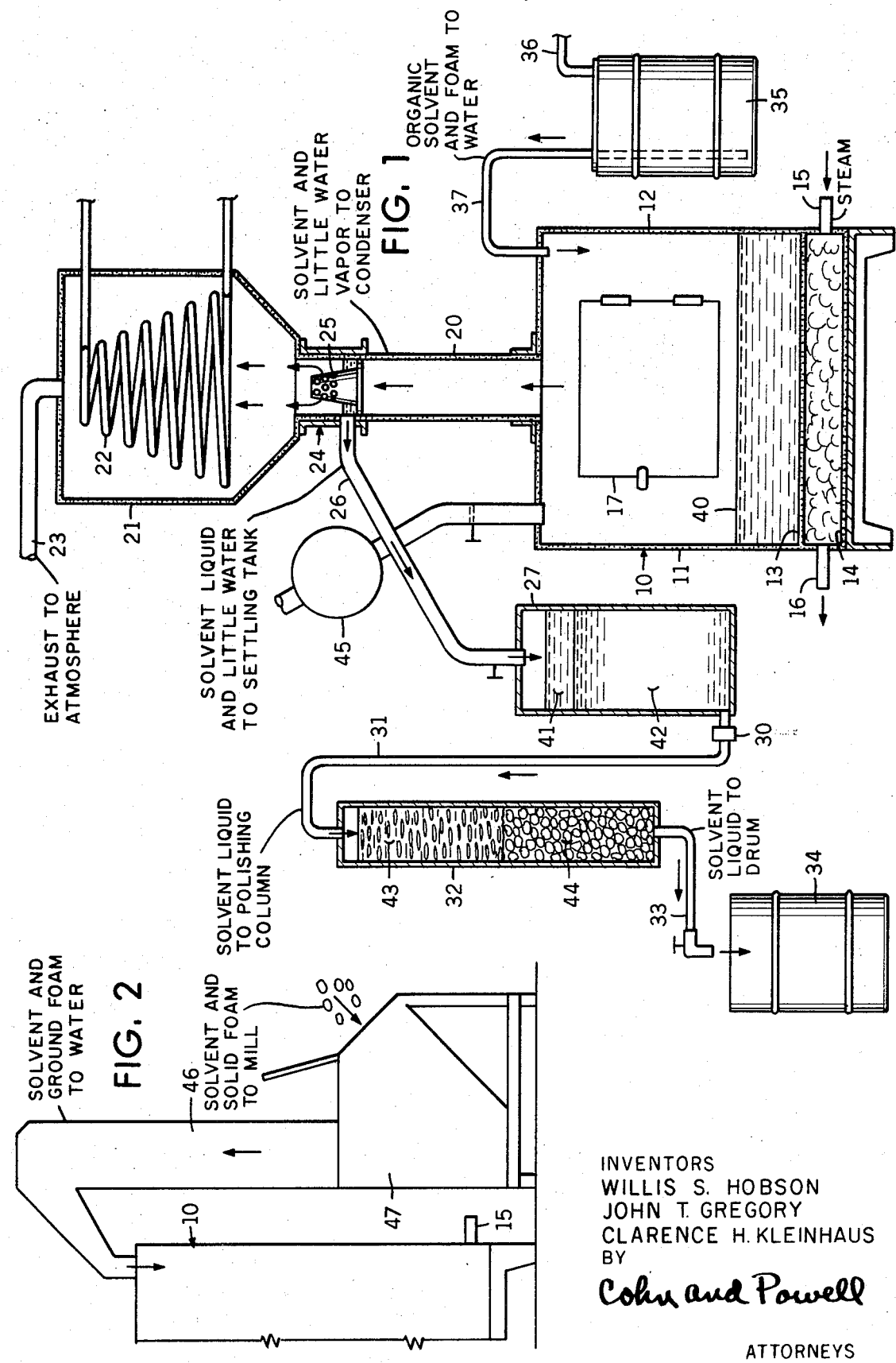

3,697,388
PROCESS OF RECLAIMING A LIQUID ORGANIC SOLVENT FROM A FOAM CONTAMINANT
Willis S. Hobson and John T. Gregory, Seymour, and Clarence H. Kleinhaus, Columbus, Ind., assignors to Seymour Manufacturing Co., Seymour, Ind.
Filed Nov. 6, 1969, Ser. No. 874,659
Int. Cl. B01d 3/36
U.S. Cl. 203—96       7 Claims

ABSTRACT OF THE DISCLOSURE

The process of reclaiming a liquid organic solvent from a foam contaminant consisting of a synthetic polymer mixed with a catalyst to form a foam, in which a quantity of liquid is placed into a still pot, the liquid being one that has a boiling point that is greater than that of the solvent, and feeding the solvent and foam contaminant mixture into the still pot liquid that has been heated to a temperature above the boiling point of the solvent yet below the boiling point of the liquid whereby the solvent vaporizes, the solvent vapor being passed through a condenser and the resultant solvent liquid being recovered. The solvent can be a chlorinated solvent of a class including methylene chloride, trichloroethylene and methyl chloroform, the still pot liquid can be water, and the foam contaminant can be of a class including polyurethane foam and polystyrene foam. The solvent and foam contaminant mixture is fed into the heated water above the liquid level and at a rate determined by the capacity of the condenser. The amount of water provides sufficient depth to cover the batch of solvent and contaminant mixture fed into the pot, the foam contaminant being removed physically from the water after the solvent has been vaporized from the batch. The solvent vapor, together with a minor amount of water vapor, is delivered into a settling tank, the water being lighter than the solvent liquid to provide a covering layer in the settling tank to prevent evaporation of the solvent liquid. The solvent liquid is drawn from the settling tank and passed through a desiccant to remove any remaining quantity of water.

BACKGROUND OF THE INVENTION

This invention relates generally to a process of reclaiming a liquid organic solvent from a foam contaminant, and more particularly, to the process of distilling a solvent such as methylene chloride or trichloroethylene or methyl chloroform from a contaminant such as polyethylene foam or polystyrene foam.

It is well-known that polyethylene foam and polystyrene foam is used as an insulation in a wide variety of products, as for example, in refrigeration cabinets and automobile panels. A synthetic resin (synthetic polymer) is mixed with a catalyst such as amines, tin soaps or others, in a dispensing gun and applied at the bottom of a mold such as is provided by a refrigerator wall cabinet. The mixture of the resin with the catalyst has a reaction that forms a foam that expands and fills the mold. In some instances, a blowing agent consisting of an organic solvent such as methylene chloride is also introduced into the gun with the synthetic resin and catalyst to provide the motive force for propelling the mixture from the gun to the point of desired application. In one specific example of foam, the resin is TD1 (toluene diisocyanate), the catalyst is either sorbitol (resin grade) or a sucrose based amine, and the blowing agent is methylene chloride.

Because the foam tends to set up rather quickly in the gun, it is necessary to eliminate any foam residue in the gun immediately after each application. This foam residue is flushed from the gun by an injection of a liquid organic solvent which can be a chlorinated solvent such as methylene chloride or trichloroethylene or methyl chloroform. This solvent, together with the foam contaminant is collected and heretofore has been disposed of because there has been no practical method of reclaiming the solvent.

Under the conventional and known distilling processes, this organic solvent and foam contaminant mixture was placed in a still pot and heated in an attempt to vaporize the solvent, then condense it and recover any resultant solvent liquid. However, in practice, it was found that the foam contaminant, when heated in this manner, had a further expansion reaction and coated the interior walls of the still pot and any heat coils that were used inside of such pot. This coating of foam contaminant set up very quickly and insulated the pot walls and the coils against heat, and further required that such coating be chipped off the walls and coils after each batch. The problems created by this insulating coating of the foam contaminant made the recovery of the organic solvent economically and practically impossible.

SUMMARY OF THE INVENTION

The present process of reclaiming a liquid organic solvent from a foam contaminant consisting of a synthetic polymer mixed with a catalyst to form a foam, does not result in the formation of any insulating coating on the still pot walls and enables the quick and easy removal of the foam contaminant from the still pot after the organic solvent has been reclaimed from each batch.

The process includes the steps of placing a quantity of liquid into a still pot, the liquid being one that has a boiling point that is greater than that of the solvent, and heating the liquid to a temperature above the boiling point of the solvent, yet below the boiling point of the liquid. The solvent and foam contaminant mixture is then introduced into the heated liquid whereby the solvent vaporizes. The solvent vapors are passed through a condenser and the resultant solvent liquid is recovered.

Although any liquid organic solvent having the characteristics defined above can be reclaimed by the present method, the method is particularly useful for reclaiming chlorinated solvents since they are most widely used as flushing agents for foam contaminants.

In the preferred use of the process, the chlorinated solvent is of a class including methylene chloride, trichloroethylene and methyl chloroform, the liquid used in the still pot is water, and the foam contaminant is of a class including polyurethane foam and polystyrene foam.

In this process, the solvent and foam contaminant mixture is dropped into the heated still pot liquid from above the liquid level and is fed into the still pot liquid at a rate determined by the capacity of the condenser. If the solvent and foam contaminant mixture is substantially liquid and of a suitable viscosity, such mixture is fed into the heated still pot liquid by pumping. If the solvent and foam contaminant mixture is substantially lumpy or solid, such mixture is first comminuted by a hammer mill or grinder and the resultant ground material is then conveyed into the pot.

The amount of still pot liquid is sufficient to provide depth to cover the batch of the solvent and foam contaminant mixture fed into the pot. After the solvent has been vaporized and reclaimed from the batch, the foam contaminant is physically removed from the still pot liquid.

The solvent vapor during the distilling process carries an amount of still pot liquid vapor with it to the condenser, the resultant solvent liquid and still pot liquid being delivered into a settling tank. Because the solvent has a greater liquid weight than the still pot liquid, the still pot liquid provides a covering layer for the solvent liquid in the settling tank to prevent evaporation of the solvent liquid.

BRIEF DESCRIPTION OF THE DRAWING

FIG. 1 is a diagrammatic view of the reclaiming process, and

FIG. 2 is a fragmentary diagrammatic view of a modified meanss for conditioning and conveying material to the still pot.

DESCRIPTION OF THE PREFERRED EMBODIMENT

Referring now by characters of reference to the drawing and first to FIG. 1, it will be understood that the process utilizes a still pot 10, the internal chamber 11 of which is partially defined by side walls 12 and a bottom wall 13. A steam jacket 14 is provided below the bottom pot wall 13 for heating the pot 10. Steam conduits 15 and 16 represent an inlet and outlet respectively to the steam jacket 14.

A large door 17 is provided on the front of the still pot 10, the door 17 being of sufficient size to enable ready access to all parts of the pot interior for reasons which will be apparent on later description of parts and procedure.

A stack 20 communicating with the chamber 11 of the still pot 10 leads to a condenser 21. Located within the condenser 21 are condensing coils 22 through which cool or cold water is circulated. An exhaust pipe 23 is connected to the top of the condenser 21.

Located between the stack 20 and the condenser 21 is a reflux splitter 24. The splitter 24 includes a frusto-conical body having a plurality of peripheral holes 25 through which vapor can pass to the condenser 21. A liquid outlet 26 communicates with the bottom collector of the splitter 24 to receive the condensed liquid and deliver it to a settling tank 27. The reclaimed liquid is feed from the settling tank 27 by pump 30 and through pipe 31 into a polishing column 32, and is subsequently fed from the column 32 by pipe 33 into the shipping drum 34.

The product to be reclaimed by this distilling process is a liquid organic solvent and it is to be separated from foam contaminant consisting of a synthetic polymer mixed with a catalyst to form a foam. One specific type of organic solvent that this process is especially useful for reclaiming, is a chlorinated solvent such as carbon tetrachloride, methylene chloride, trichloro ethylene and methyl chloroform among others. The foams constituting the contaminant from which the organic solvent can be separated are of a class including polyurethane foam and polystyrene foam.

The product as it comes to the distiller for processing can be either liquid, liquid with lumpy solids or substantially solid. This mixture is collected in drums as a gun operator flushes the foam from the gun periodically with the organic solvent.

If the organic solvent and foam contaminant mixture is liquid and of suitable viscosity, it can be fed into the still pot 10 as illustrated in FIG. 1. For example, the drum 35 containing the organic solvent and foam contaminant mixture is connected to a source of air pressure by line 36. Upon applying air pressure to the interior of the drum 35, the mixture is forced through the feed line 37 into the top of the still pot 10. The rate of feed of the mixture is controlled by the air pressure applied.

In this process, a quantity of liquid 40 is placed in the still pot 10 to provide a depth sufficient to cover the batch of solvent and foam contaminant mixture that is fed into the pot 10. This liquid 40 is one that has a boiling point that is greater than that of the solvent. It has been found that water can be advantageously utilized as such liquid 40 when reclaiming widely used chlorinated solvents such as methylene chloride, trichloroethylene and methyl chloroform.

The still pot liquid 40 is heated to a temperature just above the boiling point of the organic solvent, but below the boiling point of such liquid 40. For example, when reclaiming methylene chloride which has a boiling point of approximately 104° F., water constituting the liquid 40 is heated to approximately 130° to 140° F. When recovering trichloroethylene which has a boiling point of approximately 190° F., the water is heated to approximately 195° F.

The organic solvent and foam contaminant mixture is fed into the still pot 10 through the feed line 37 and dropped into the heated still pot liquid 40 at a predetermined rate of feed that is determined by the capacity of the condenser 21. It is important that this mixture is delivered into the heated liquid 40 from above the liquid level. If it were introduced at or below the liquid level, the foam contaminant, which tends to set up rather quickly, would clog the inlet. As the solvent and foam contaminant mixture contacts the still pot liquid 40, the organic solvent immediately vaporizes and the solvent vapor rises upwardly into and through the stack 20. The foam contaminant, in the form of small particles, will sink to the bottom of the liquid 40. By the time the foam contaminant particles reach the bottom of the still pot 10, all of the organic solvent contained within and associated with such foam contaminant particles has been vaporized. The still pot liquid 40 keeps the contaminant particles coated and keeps the foam contaminant from coating the interior of the still pot.

A minor amount of still pot liquid vapor is carried with the solvent vapor into the stack 20 through the splitter 24 and into the condenser 21. As the solvent vapor and still pot liquid vapor pass over the condensing coils 22, such vapors are condensed and fall back into the collector of the splitter 24. The condensed solvent liquid and still pot liquid flows from the splitter 24 through pipe 26 into a settling tank 27 where the condensed liquid mixture is allowed to sit for a period of time. Because the liquid weight of the solvent liquid is greater than that of the still pot liquid, the still pot liquid 40 prevents the solvent liquid of layer 42 from evaporating.

Then the solvent liquid is fed by pump 30 through the pipe 31 into the polishing column 32 which contains a quantity of desiccant such as a layer of molecular sieve 43 and a layer of activated charcoal 44 which removes all remaining traces of the still pot liquid from the solvent liquid. The reclaimed solvent liquid is then fed into a suitable shipping drum 34.

After a batch of the organic solvent and foam contaminant mixture have been processed in the manner described above, an exhaust fan 45 is energized to draw off all obnoxious and toxic fumes from the interior of the still pot 10 and then the door 17 is opened. The foam contaminant which is usually in particle form and covered by the still pot liquid 40, is then simply removed. One of the most common ways of removing this foam contaminant is with a perforated shovel by which the contaminant can be lifted out of the water and through the door opening for disposal. If the liquid level of the still pot liquid 40 has been lowered by the reclaiming process of a particular batch, additional liquid is added to maintain the desired liquid level before a new batch is processed. Then the door 17 is closed, the exhaust fan 45 is turned off and another batch of solvent and foam contaminant is processed.

Under some circumstances, the product to be processed is lumpy or is substantially solid and cannot be fed directly from the drum 35 under air pressure into the still pot 10. In this event, the solvent and foam contaminant is removed from the drum 35 and fed into a hammer mill or grinder generally indicated by 47 in FIG. 2. The resultant ground material is then conveyed by any suitable means, such as an elevator or screw auger generally indicated by 46, into the top of the still pot 10. The process of reclaiming the organic solvent from this conditioned material is the same as that previously described. It is desirable to break up any large lumps or solid pieces comprising the mixture of solvent and foam contaminant into relatively small particles in order to provide more contact surface with the heated still pot liquid 40 to effect more efficient removal and vaporization of the solvent from such particles of the foam contaminant.

It is thought that the process has been fully described, but for completeness of disclosure, a specific example will be assumed.

One common product, among many of organic solvent and foam contaminant mixtures processed, contains methylene chloride as the solvent and polyurethane foam as the contaminant. This polyurethane foam is formed by a resin TD1 (toluene diisocyanate) and a catalyst of either sorbitol (resin grade) or a sucrose base amine. The still pot liquid 40 is water which is of a sufficient depth determined by the batch of the mixture to be processed. This water 40 is heated to approximately 140° F. Water has a boiling point that is greater than that of methylene chloride.

The methylene chloride and polyurethane foam mixture is fed into the water at a rate determined by the capacity of the condenser 21. As the mixture strikes the heated water, the methylene chloride immediately vaporizes and rises into the stack 20. The polyurethane foam submerges into the water 40 and remains covered by such water 40. The water-coated polyurethane foam particles will not coat the inside wall of the still pot 10, but merely sink and collect at the bottom.

The methylene chloride vapor, together with a minor amount of water vapor passes through the splitter 24 and into the condenser 21. Contact with the condensing coils 22 causes the vapors to condense and collect at the splitter 24 where the resultant methylene chloride liquid and water is fed by pipe 26 into a settling tank 27. As the methylene chloride liquid and water stand for a period of time, the water will form a layer 41 on top of a layer 42 of the methylene chloride liquid because methylene chloride liquid is heavier than water. The methylene chloride is then fed by pump 30 into the polishing column 32 wherein the desiccant, consisting of molecular sieve and activated charcoal, remove any remaining traces of water from the methylene chloride liquid. Then the reclaimed methylene chloride is fed into a shipping drum 34.

After a batch of this particular mixture of methylene chloride and polyurethane foam has been processed, the exhaust fan 45 is energized and the door 17 of the still pot 10 is opened. The polyurethane foam particles that have collected at the bottom of the still pot 10 and submerged in the water 40 are simply removed with a shovel. If necessary, water is added to maintain the appropriate depth for the processing of the next batch.

We claim as our invention:

1. The process of reclaiming a liquid organic solvent from a contaminant consisting of a synthetic polymer mixed with a catalyst to form a foam, the mixture being collected by flushing foam residue from a dispensing gun by an injection of the liquid organic solvent, comprising the steps of:
    (a) placing a quantity of water into a still pot, the water having a boiling point that is greater than that of the solvent,
    (b) heating the water to a temperature above the boiling point of the solvent, yet below the boiling point of the water,
    (c) introducing the solvent and contaminant mixture into the heated water whereby the solvent vaporizes,
    (d) passing the solvent vapor to a condenser,
    (e) recovering the resultant solvent liquid,
    (f) the solvent being a chlorinated solvent of a class including methylene chloride, trichloroethylene and methyl chloroform, and
    (g) the foam contaminant being of a class including polyurethane foam and a polystyrene foam.

2. The process as defined in claim 1, in which:
    (h) the amount of water in the pot provides sufficient depth to cover the solvent and contaminant mixture fed into the pot.

3. The process as defined in claim 1, in which:
    (h) the solvent vapor carries an amount of still pot water vapor with it to the condenser,
    (i) the resultant solvent liquid and still pot water is delivered from the condenser into a settling tank, and
    (j) the solvent liquid has a greater liquid weight than the still pot water so that the still pot water covers the solvent liquid in the settling tank to prevent evaporaion of the solvent liquid.

4. The process of reclaiming a liquid organic solvent from a contaminant consisting of a synthetic polymer mixed with a catalyst to form a foam, the mixture being collected by flushing foam residue from a dispensing gun by an injection of the liquid organic solvent, comprising the steps of:
    (a) placing a quantity of water into a still pot, the water having a boiling point that is greater than that of the solvent,
    (b) heating the water to a temperature above the boiling point of the solvent, yet below the boiling point of the water,
    (c) introducing the solvent and contaminant mixture into the heated water whereby the solvent vaporizes,
    (d) passing the solvent vapor to a condenser,
    (e) recovering the resultant solvent liquid,
    (f) the solvent being a chlorinated solvent of a class including methylene chloride, trichloroethylene, and methyl chloroform,
    (g) the foam contaminant being of a class including polyurethane foam and polystyrene foam,
    (h) the solvent and contaminant mixture being dropped into the heated water from above the water level, and
    (i) the solvent and contaminant mixture being fed into the water at a rate determined by the capacity of the condenser.

5. The process of reclaiming a liquid organic solvent from a contaminant consisting of a synthetic polymer mixed with a catalyst to form a foam, the mixture being collected by flushing foam residue from a dispensing gun by an injection of the liquid organic solvent, comprising the steps of:
    (a) placing a quantity of water into a still pot, the water having a boiling point that is greater than that of the solvent,
    (b) heating the water to a temperature above the boiling point of the solvent, yet below the boiling point of the water,
    (c) introducing the solvent and contaminant mixture into the heated water whereby the solvent vaporizes,
    (d) passing the solvent vapor to a condenser,
    (e) recovering the resultant solvent liquid,
    (f) the solvent being a chlorinated solvent of a class including methylene chloride, trichloroethylene and methyl chloroform,
    (g) the foam contaminant being of a class including polyurethane foam and polystyrene foam,
    (h) the solvent and foam contaminant mixture being dropped into the heated water from above the water level,
    (i) the solvent and foam contaminant mixture being fed into the water at a rate determined by the capacity of the condenser,
    (j) the amount of water in the pot providing sufficient depth to cover a batch of the solvent and contaminant mixture fed into the pot, and
    (k) the contaminant being removed physically from the water after the solvent has been vaporized from the batch.

6. The process as defined in claim 3, in which:
(k) the solvent liquid is drawn from the settling tank and passed through a desiccant to remove any remaining quantity of still pot water.

7. The process of reclaiming a liquid organic solvent from a contaminant consisting of a synthetic polymer mixed with a catalyst to form a foam, comprising the steps of:
(a) placing a quantity of water into a still pot, the water having a boiling point that is greater than that of the solvent,
(b) heating the water to a temperature above the boiling point of the solvent, yet below the boiling point of the water,
(c) introducing the solvent and contaminant mixture into the heated water whereby the solvent vaporizes,
(d) passing the solvent vapor to a condenser,
(e) recovering the resultant solvent liquid,
(f) the solvent is a chlorinated solvent of a class including methylene chloride, trichloroethylene and methyl chloroform,
(g) the foam contaminant is of a class including polyurethane foam and polystyrene foam,
(h) the solvent and foam contaminant mixture is dropped into the heated water above the water level,
(i) the solvent and contaminant mixture is fed into the water at a rate determined by the capacity of the condenser,
(j) the amount of water in the pot provides sufficient depth to cover a batch of the solvent and contaminant mixture fed into the pot,
(k) the contaminant is removed physically from the water after the solvent has been vaporized from the batch,
(l) the solvent vapor carries an amount of water vapor with it to the condenser,
(m) the resultant solvent liquid and water is delivered from the condenser into a settling tank,
(n) the solvent liquid has a greater liquid weight than water so that the water covers the solvent liquid in the settling tank to prevent evaporation of the solvent liquid, and
(o) the solvent liquid is drawn from the settling tank and passed through a desiccant to remove any remaining quantity of water.

References Cited

UNITED STATES PATENTS

| | | | |
|---|---|---|---|
| 2,974,131 | 3/1961 | McLeod | 159—16 S |
| 2,959,561 | 11/1960 | Kelley | 159—48 L |
| 2,716,669 | 8/1955 | Fravel | 159—48 L |
| 2,838,801 | 6/1958 | De Long et al. | 260—2.5 E |
| 3,219,548 | 11/1965 | Margiloff | 203—100 |
| 3,214,349 | 10/1965 | Kehoe et al. | 203—100 X |
| 3,234,995 | 2/1966 | Van den Berg et al. | 159—47 |
| 3,304,274 | 2/1967 | Eng | 260—2.5 B |
| 3,349,010 | 10/1967 | Plaster | 203—99 |

FOREIGN PATENTS

| | | | |
|---|---|---|---|
| 119,880 | 1958 | Russia | 203—100 |

OTHER REFERENCES

American Chemical Society, "Azeotropic Data," p. 6 (1952).

NORMAN YUDKOFF, Primary Examiner

D. EDWARDS, Assistant Examiner

U.S. Cl. X.R.
203—100; 260—652